United States Patent [19]

Nishio et al.

[11] Patent Number: 5,494,948
[45] Date of Patent: Feb. 27, 1996

[54] MICA-REINFORCED PROPYLENE RESIN COMPOSITION

[75] Inventors: Taichi Nishio, Chiba; Yuji Ikezawa, Nagoya, both of Japan

[73] Assignee: Sumitomo Chemical Company, Limited, Osaka, Japan

[21] Appl. No.: 313,351

[22] Filed: Sep. 26, 1994

[30] Foreign Application Priority Data

Sep. 24, 1993 [JP] Japan ................... 5-237853

[51] Int. Cl.⁶ ................... C08K 9/02
[52] U.S. Cl. ................... 523/204; 523/207; 523/212; 523/213; 524/265; 524/449; 524/548; 524/555; 524/582; 524/588
[58] Field of Search ................... 524/265, 449, 524/548, 555, 582, 588; 523/204, 207, 212, 213

[56] References Cited

U.S. PATENT DOCUMENTS

| | | | |
|---|---|---|---|
| 4,891,399 | 1/1990 | Ohkawa et al. | 524/440 |
| 5,221,781 | 6/1993 | Aida et al. | 524/451 |
| 5,221,782 | 6/1993 | Aida et al. | 524/451 |
| 5,240,973 | 8/1993 | Katoh et al. | 524/502 |

*Primary Examiner*—Morton Foelak
*Attorney, Agent, or Firm*—Cushman Darby & Cushman

[57] ABSTRACT

A mica-reinforced propylene resin composition having a volatile matter at 105° C of 0.12% or less is obtained by heating and melting a mixture containing (A) a crystalline polypropylene, (B) mica treated with an organosilane compound, (C) a bismaleimide compound, and (D) an organic peroxide. It has excellent stiffness, heat resistance and dimensional stability, does not corrode a mold, and does not exhale an irritating odor during molding.

13 Claims, No Drawings

MICA-REINFORCED PROPYLENE RESIN COMPOSITION

The present invention relates to a micareinforced propylene resin composition.

Propylene resins, which have good mechanical properties, chemical properties, thermal properties and moldability, are widely used for making industrial parts. Compositions containing a propylene resin and one or more various fillers also possess an improved stiffness, heat resistance, dimensional stability and the like. In particular, mica-reinforced polypropylenes containing a propylene resin and mica are superior in stiffness, heat resistance and dimensional stability. However, use of a mere blend of a polypropylene and mica does not give a molded product having desirable mechanical and thermal properties (e.g. tensile strength, flexural strength and heat distortion temperature) due to weak binding between the propylene resin and mica.

JP-A-55-104338 and JP-B-58-17544 disclose a method for improving the reinforcing effect in mica-reinforced polypropylenes which comprises treating the surface of mica with an organosilane compound and modifying a polypropylene with an unsaturated carboxylic acid.

However, along the recent trend of severe requirement for the balance in physical properties, the appearance of molded articles has become regarded as an important performance.

As mentioned above, an unsaturated carboxylic acid is used for modification of polypropylenes to enhance the reinforcing effect. Employment of a material such as an unsaturated carboxylic acid, however, causes the corrosion of a mold during a long-term molding of mica-reinforced polypropylenes. The corrosion of a mold, in turn, greatly damages the surface appearance of molded products. Moreover, employment of a material such as an unsaturated carboxylic acid exhales during the molding an irritating odor which hurts the eyes and nose. Therefore, there has been a request of improving the environment of a molding site. The propylene resin compositions containing a polypropylene modified with an unsaturated carboxylic acid are not free from the above defects. There has not been reported a mica-reinforced polypropylene with a good balance in physical properties which does not corrode a mold and solves the problem of the environment of the molding site.

The present invention is intended to provide a novel mica-reinforced propylene resin composition which is superior in stiffness, heat resistance and dimensional stability, does not corrode a mold, and does not exhale an irritating odor during the molding.

The present inventors investigated mica-reinforced propylene compositions in order to achieve the above intention, and consequently have accomplished the present invention.

That is, the present invention provides a mica-reinforced propylene resin composition obtained by heating and melting a mixture comprising:

(A) 40 to 95 parts by weight of a crystalline polypropylene, (B) 60 to 5 parts by weight of mica treated with an organosilane compound, in which the weight ratio of said organosilane compound to said mica falls within the range of from 0.01:100 to 2.0:100, (C) a bismaleimide compound in an amount of 0.01 to 2.0 parts by weight per 100 parts by weight of the sum of components (A) and (B), and (D) an organic peroxide, said composition having a volatile matter at 105° C. of 0.12% or less.

The crystalline polypropylene used in the present invention refers to propylene homopolymer; copolymers of propylene and an e-olefin other than propylene; mixtures of a propylene homopolymer and one or more copolymers of propylene and an α-olefin other than propylene; mixtures of a propylene homopolymer and one or more homopolymers of an α-olefin other than propylene; mixtures of one or more copolymers of propylene and an α-olefin other than propylene and one or more homopolymers of an α-olefin other than propylene; mixtures of a propylene homopolymer, one or more copolymers of propylene and an α-olefin other than propylene and one or more homopolymers of an α-olefin other than propylene; and mixtures of two or more copolymers of propylene and an α-olefin other than propylene. The melt index of the crystalline polypropylene preferably falls within the range of from 0.5 to 150 g/10 min.

The mica used in the present invention is not particularly limited. Preferably, it is flaky mica having an average diameter of 60μ to 700μ and an aspect ratio (diameter/thickness) of 30 to 80.

The organosilane compound used for treating mica in the present invention is not particularly limited. Specific examples thereof are α-glycidoxypropyltrimethoxysilane, β-(3,4-epoxycyclohexyl)ethyltrimethoxysilane, β-methacryloxypropyltrimethoxysilane, α-aminopropyltriethoxysilane, N-β-(aminoethyl)-α-aminopropyltrimethoxysilane, α-ureidopropyltrimethoxysilane and N-β-(aminoethyl)-α-aminopropylmethyldimethoxysilane. Aminosilane compounds containing one or more amino groups are more effective in achieving the object of the present invention.

The proportion of the organosilane compound ranges from 0.01 to 2.0 parts by weight, preferably from 0.1 to 1.0 part by weight, per 100 parts by weight of mica. Use of the organosilane compound in a proportion of less than 0.01 part by weight cannot improve the mechanical and thermal properties of the resulting composition due to weak reinforcing effect of the organosilane compound-treated mica on the crystalline polypropylene. Use of the organosilane compound in a proportion of more than 2.0 parts by weight, in turn, reduces the flowability and moldability of the resulting composition and permits no economical benefits.

The weight percentage of the mica treated with a specific amount of the organosilane compound ranges from 60 to 5% by weight relative to the total weight of the mica and the crystalline polypropylene, while the weight percentage of the crystalline polypropylene ranges from 40 to 95% by weight. Use of mica in an amount of less than 5% by weight gives no composition with desirable mechanical and thermal properties. Use of mica in an amount of more than 60% by weight causes serious breakage of mica which prevents any marked improvement of the mechanical strength of the resulting composition.

The bismaleimide compound used in the present invention has the formula (I):

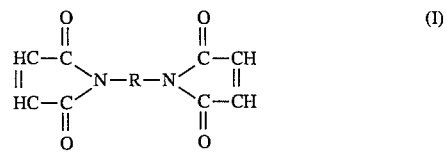

wherein R is a substituted or unsubstituted aromatic hydrocarbon group, or a substituted or unsubstituted aliphatic hydrocarbon group. Specific examples of the bismaleimide compound are 4,4'-methylenediphenylbismaleimide, m-phenylenebismaleimide, 4-methyl-m-phenylenebismaleimide, 4,4'-ethylenediphenylbismaleimide and 4,4'-vinylenediphenylbismaleimide.

The proportion of the bismaleimide compound ranges from 0.01 to 2.0 parts by weight, preferably from 0.1 to 1.0 part by weight, per 100 parts by weight of a mixture (A +B) of the crystalline polypropylene (A) and the mica treated with a specific amount of the organosilane compound (B). Use of the bismaleimide compound in an amount of less than 0.01 part by weight gives no composition with desirable mechanical and thermal properties due to the absence of reinforcing effect with mica. Use of the bismaleimide compound in an amount of more than 2.0 parts by weight does not give any marked improvement of the mechanical and thermal properties of the resulting composition and is disadvantageous in cost.

Although not particularly limited, the organic peroxide used in the present invention includes 2,5-dimethyl-2,5-di(tert-butylperoxy)hexane, dicumyl peroxide, tert-butylcumyl peroxide, 2,5-dimethyl-2,5-di(tert-butylperoxy)hexane-3, α,α'-bis(tert-butylperoxy)diisopropylbenzene, etc.

These organic peroxides should be completely decomposed in the heating and melting treatment. The amount of the organic peroxide added falls preferably within the range of from 0.001 to 0.05 part by weight per 100 parts by weight of the mixture (A +B). Use of the organic peroxide in an amount of less than 0.001 part by weight gives no sufficient reinforcing effect on the resulting composition. Use of the organic peroxide in an amount of more than 0.05 part by weight causes difficulties in pelletization of the composition in extrusion granulation and gives no composition with desirable mechanical and thermal properties.

The mica-reinforced propylene resin composition of the present invention is produced by a conventional process. For example, it is obtained by mixing a crystalline polypropylene, a bismaleimide compound, an organic peroxide and a mica treated with the organosilane compound, and melt-kneading the resulting mixture with a vented (single-screw or twin-screw) extruder.

The resulting composition has a volatile content at 105° C. of 0.12% or less. A propylene resin composition having a volatile content of more than 0.12% does not exhibit well balanced mechanical and thermal properties and corrodes a mold seriously.

The heating and melting treatment is preferably carried out at a temperature of from 210° C. to 290° C. The treatment at a temperature lower than 210° C. sometimes causes the breakage of mica and reduces its aspect ratio. Moreover, it sometimes loses the balance in mechanical and thermal properties of the resulting composition due to insufficient reaction between the crystalline polypropylene and mica. Also, it sometimes gives a composition having an unsatisfactory balance in mechanical and thermal properties due to the formation of foams in the course of granulation of the composition by the moisture contained in the organosilane compound and mica which has not always been sufficiently removed by vacuum suction through a vent. Furthermore, it sometimes causes the breakage of the strand of the composition during the granulation which disturbs usual extrusion granulation. The treatment at a temperature higher than 290° C., in turn, sometimes gives a composition having an undesirable mechanical and thermal properties due to the thermal decomposition of the crystalline polypropylene.

The extruder used for the heating and melting treatment is preferably a single-screw or twin-screw vented extruder which permits vacuum suction through its vent. When such an extruder is used, the extent of vacuum suction is preferably such that the degree of vacuum is 300 or more. When the degree of vacuum is less than 300, there is sometimes obtained a propylene resin composition having an unsatisfactory balance in mechanical and thermal properties due to insufficient reaction between the crystalline polypropylene and mica. In addition, the increase of the volatile content of the resulting composition due to insufficient reaction between the crystalline polypropylene and mica sometimes gives rise to injury to the appearance of a product molded out of the composition as well as deterioration of the mechanical and thermal properties of the molded product.

When a twin-screw extruder is used, it is preferable to employ a method which comprises mixing a crystalline polypropylene, a bismaleimide compound, an organic peroxide, a stabilizer, etc. thoroughly in a Henschel mixer, feeding the resulting mixture through a first feed, feeding a mixture of an organosilane compound and mica through a second feed, and carrying out vacuum suction through a vent.

For mixing mica with the organosilane compound in the present invention, there can be used mixers such as a Henschel mixer, ribbon mixer, tumbling mixer, twin-cylinder mixer, etc. These mixers can be used also for mixing the mica-reinforced propylene resin composition. In this case, conventional stabilizers, nucleating agents, pigments, antistatic agents, other additives, etc. may be blended with the crystalline polypropylene.

The present invention is explained with the following examples, which are not by way of limitation but by way of illustration.

Methods for measuring the physical properties in the examples are described below.

(1) Melt index (MI)

Measured according to the method prescribed in JIS K 6758. The measuring temperature was 230° C. and the measurement was carried out under a load of 2.16 kg.

(2) Tensile test

Carried out according to the method prescribed in ASTM D638. A test piece obtained by injection molding was used. The thickness of the test piece was 3.2 mm, and the tensile strength at yield point was evaluated. The measuring temperature was 23° C.

(3) Flexural test

Carried out according to the method prescribed in JIS K 7203. A test piece obtained by injection molding was used. The thickness of the test piece was 6.4 mm, and the flexural modulus and the flexural strength were evaluated under conditions of a span length of 100 mm and a loading rate of 2.0 mm/min. The measuring temperature was 23° C.

(4) Izod impact strength

Measured according to the method prescribed in JIS K 7110. A test piece obtained by injection molding was used. The thickness of the test piece was 6.4 mm and the notched impact strength was evaluated after molding and notching. The measuring temperature was 23° C.

(5) Heat distortion temperature (HDT)

Carried out according to the method prescribed in JIS K 7207. Fiber stress was measured at 18.5 kg/cm².

(6) Corrosion test

A surface of a 30 mm×50 mm×2 mm iron plate (SS-41) was polished with sandpaper (No. AA400). Resin pellets were placed on the polished surface, and pressed with a heating press at 280° C. The iron plate was transferred to a cooling press to be cooled, after which the resin on the iron plate was removed. The pressing was conducted according to JIS K 6758. The above procedure was repeated 5 times by using the same iron plate. Then, the iron plate was allowed to stand in a desiccator containing water for 24 hours in an atmosphere of 23° C. The iron plate was taken out, uniformly sprayed with transparent lacquer, and then air-dried.

The degree of corrosion of the surface of the iron plate was visually evaluated in 5 grades.

| Rank | Degree |
| --- | --- |
| 1 | No corrosion |
| 2 | Very slight corrosion |
| 3 | Corrosion of a part of the iron plate |
| 4 | Corrosion of one-half the area of the iron plate |
| 5 | Corrosion of the whole surface of the iron plate |

(7) Odor test

The odor of the product extruded by continuous rotation with an injection molding machine was examined. An irritating odor is expressed by x, almost no irritating odor by o, and intermediate between them by Δ.

The injection molding was carried out under the same conditions as the test piece molding conditions shown in Table 1.

(8) Measurement of volatile matter (VM)

30 Grams of resin was placed in a porcelain crucible whose weight had become constant at 105° C. The porcelain crucible was allowed to stand in a circulating hot-air drier at 105° C. for 2 hours and then allowed to cool in a desiccator. The difference of the weight before and after the standing and cooling is shown as a percentage.

TABLE 1

Test piece molding conditions

| Injection molding machine (IS 150E, mfd. by Toshiba Corp.) | | Heater zone | | | | |
| --- | --- | --- | --- | --- | --- | --- |
| | NH | $H_1$ | $H_2$ | $H_3$ | $H_4$ | (hopper side) |
| Preset temp. of cylinder (°C.) | 220 | 220 | 220 | 210 | 200 | |
| Injection pressure (kg/cm²) | 400 | | | | | |
| Mold temp. (°C.) | 50 | | | | | |
| Injection time (sec) | 15 | | | | | |
| Cooling time (sec) | 30 | | | | | |

EXAMPLE 1

Phlogopite having a weight average diameter of and a weight average aspect ratio of 65 (mfd. by KURARAY CO., LTD.) was placed in a Henschel mixer. Thereto was added 0.5 part by weight, per 100 parts by weight of the phlogopite, of γ-aminopropyltriethoxy-silane by drops while stirring to obtain a mixture (B). 40.2 parts by weight of the mixture (B) was mixed with 60 parts by weight of a crystalline homopolypropylene powder (A) (Sumitomo Noblen® HZ100A) having a melt flow rate of 20 to obtain a mixture (A+B). 0.5 Part by weight of m-phenylenebismaleimide as a bismaleimide compound (C), 0.004 part by weight of 2,5-dimethyl-2,5-di(tert-butylperoxy)hexane as an organic peroxide (D) and 0.1 part by weight of Irganox®1010 (mfd. by Ciba-Geigy Ltd.) as a heat stabilizer were mixed with 100.2 parts by weight of the mixture (A+B) in a Henschel mixer to obtain a mixture (A+B+C+D). The mixture (A+B+C+D) was pelletized with a 65-mm single-screw vented extruder (L/D=28) set at 260° C. In this case, vacuum suction through a vent was carried out at a degree of vacuum of 650.

Table 3 summarizes the granulation conditions and physical properties of the thus obtained pellets determined in accordance with the above evaluation methods.

Comparative Examples 1 to 4

The same procedure as in Example 1 was repeated except that m-phenylenebismaleimide as a bismaleimide compound (C) was omitted (Comparative Example 1), γ-aminopropyltriethoxysilane was omitted (Comparative Example 2), the organic peroxide was omitted (Comparative Example 3) or both of m-phenylene-bismaleimide and γ-aminopropyltriethoxysilane were omitted (Comparative Example 4). Table 3 shows the granulation conditions and physical properties of the thus obtained pellets.

Comparative Example 5

The same procedure as in Example 1 was repeated except that m-phenylenebismaleimide was replaced by maleic anhydride. Table 3 shows the granulation conditions and physical properties of the thus obtained pellet.

Comparative Examples 6 and 7

The same procedure as in Example 1 was repeated except that the amount of m-phenylenebismaleimide added as a bismaleimide compound (C) was changed to 3.0 parts by weight (Comparative Example 6) or a system obtained by mixing 3.0 parts by weight of γ-aminopropyltriethoxysilane with 100 parts by weight of mica was used (Comparative Example 7). Table 3 shows the granulation conditions and physical properties of the thus obtained pellets.

EXAMPLE 2

The same procedure as in Example 1 was repeated except that the phlogopite was replaced by a phlogopite having a weight average diameter of 190μ and a weight average aspect ratio of 79 (mfd. by Repco Co., Ltd.). Table 3 shows the granulation conditions and physical properties of the thus obtained pellet.

EXAMPLE 3

The same procedure as in Example 1 was repeated except for using 100.1 parts by weight of a mixture (A+B) of 20.1 parts by weight of the same aminosilane compound-treated mica (B) as used in Example 1 and 80 parts by weight of the same homopolypropylene powder (A) as used in Example 1. The physical properties were determined in the same manner as in Example 1. Table 3 shows the results.

Comparative Example 8

The same procedure as in Example 3 was repeated except that the aminosilane compound and the bismaleimide compound were omitted. The physical properties were determined in the same manner as in Example 1. Table 3 shows the results.

EXAMPLE 4

Predetermined amounts of the same homopolypropylene powder (A), bismaleimide compound (C) and organic peroxide (D) as used in Example 1 and a thermal oxidation inhibitor were mixed in a Henschel mixer to obtain a mixture (A+C+D). This mixture was fed to a twin-screw extruder (TEX-44, mfd. by JAPAN STEEL WORKS, LTD.; L/D=30) through its first feed with a gravimetric feeder. While feeding the same aminosilane-treated mica (B) as used in Example 1 to the extruder through its second feed with a gravimetric feeder, the extruder was operated so as to attain the same final make-up as in Example 1, whereby pelletizing was carried out. The preset temperature of the twin-screw extruder was 260° C. Vacuum suction was carried out through a vent subsequent to the second feed at a degree of vacuum of 620. Table 3 shows the granulation conditions and the physical properties determined in the same manner as above of the thus obtained pellet.

Comparative Example 9

The same procedure as in Example 1 was repeated except that the vent was kept open without vacuum suction through the vent. Table 3 shows the granulation conditions and physical properties of the thus obtained pellet.

Comparative Example 10

The same procedure as in Example 1 was repeated except that the temperature of the extruder was set at 190° C. Table 3 shows the granulation conditions and physical properties of the thus obtained pellet.

TABLE 2

| | Composition (part by weight) | | | | | |
|---|---|---|---|---|---|---|
| | Poly-propylene | m-Phenylene-bismaleimide | Maleic anhydride | Aminosilane | Organic peroxide | Mica |
| Example 1 | 60 | 0.5 | — | 0.2 | 0.004 | 40 |
| Comparative Example 1 | 60 | — | — | 0.2 | 0.004 | 40 |
| Comparative Example 2 | 60 | 0.5 | — | — | 0.004 | 40 |
| Comparative Example 3 | 60 | 0.5 | — | 0.2 | — | 40 |
| Comparative Example 4 | 60 | — | — | — | 0.004 | 40 |
| Comparative Example 5 | 60 | — | 0.5 | 0.2 | 0.004 | 40 |
| Comparative Example 6 | 60 | 3.0 | — | 0.2 | 0.004 | 40 |
| Comparative Example 7 | 60 | 0.5 | — | 3.0 | 0.004 | 40 |
| Example 2 | 60 | 0.5 | — | 0.2 | 0.004 | 40 |
| Example 3 | 80 | 0.5 | — | 0.1 | 0.004 | 20 |
| Comparative Example 8 | 80 | — | — | — | 0.004 | 20 |
| Example 4 | 60 | 0.5 | — | 0.2 | 0.004 | 40 |
| Comparative Example 9 | 60 | 0.5 | — | 0.2 | 0.004 | 40 |
| Comparative Example 10 | 60 | 0.5 | — | 0.2 | 0.004 | 40 |

TABLE 3

| | Granulation conditions | | | Physical properties | | | | | | |
|---|---|---|---|---|---|---|---|---|---|---|
| | Extruder | Granulation temp. (°C.) | Degree of vacuum | VM (wt %) | Melt index (g/10 min) | Tensile strength (kg/cm$^2$) | Flexural modulus (kg/cm$^2$) | Heat distortion temperature (°C.) | Corrosion test | Odor |
| Example 1 | Single screw | 260 | 650 | 0.06 | 13 | 510 | 82000 | 142 | 1 | o |
| Comparative Example 1 | Single screw | 260 | 650 | 0.07 | 30 | 360 | 79000 | 129 | 1 | o |
| Comparative Example 2 | Single screw | 260 | 650 | 0.07 | 23 | 410 | 77000 | 133 | 1 | o |
| Comparative Example 3 | Single screw | 260 | 650 | 0.09 | 15 | 350 | 76000 | 129 | 1 | o |
| Comparative Example 4 | Single screw | 260 | 650 | 0.11 | 26 | 330 | 75000 | 127 | 1 | o |
| Comparative | Single screw | 260 | 650 | 0.09 | 15 | 480 | 80000 | 137 | 5 | x |

TABLE 3-continued

| | Granulation conditions | | | Physical properties | | | | | |
|---|---|---|---|---|---|---|---|---|---|
| | Extruder | Granulation temp. (°C.) | Degree of vacuum | VM (wt %) | Melt index (g/10 min) | Tensile strength (kg/cm$^2$) | Flexural modulus (kg/cm$^2$) | Heat distortion temperature (°C.) | Corrosion test | Odor |
| Example 5 Comparative Example 6 | Single screw | 260 | 650 | 0.09 | 10 | 470 | 82000 | 139 | 2 | Δ |
| Comparative Example 7 | Single screw | 260 | 650 | 0.10 | 3 | 460 | 81000 | 138 | 2 | o |
| Example 2 | Single screw | 260 | 650 | 0.07 | 12 | 520 | 83000 | 142 | 1 | o |
| Example 3 | Single screw | 260 | 650 | 0.07 | 15 | 420 | 42000 | 121 | 1 | o |
| Comparative Example 8 | Single screw | 260 | 650 | 0.10 | 30 | 340 | 41000 | 109 | 1 | o |
| Example 4 | Twin screw | 260 | 620 | 0.07 | 11 | 530 | 85000 | 143 | 1 | o |
| Comparative Example 9 | Twin screw | 260 | 0 | 0.15 | 14 | 470 | 80000 | 139 | 2 | o |
| Comparative Example 10 | Single screw | 190 | 650 | 0.15 | 14 | 420 | 76000 | 134 | 2 | o |

According to the present invention, there is provided a novel mica-reinforced propylene resin composition which has excellent stiffness, heat resistance and dimensional stability, does not corrode a mold, and does not exhale an irritating odor during the molding.

What is claimed is:

1. A mica-reinforced propylene resin composition obtained by heating and melting a mixture consisting essentially of:

(A) 40 to 95 parts by weight of a crystalline polypropylene, (B) 60 to 5 parts by weight of mica treated with an organosilane compound, in which the weight ratio of said organosilane compound to said mica falls within the range of from 0.01:100 to 2.0:100, (C) a bismaleimide compound in an amount of 0.01 to 2.0 parts by weight per 100 parts by weight of the sum of components (A) and (B), and (D) an organic peroxide, said composition having a volatile matter at 105° C. of 0.12% or less.

2. The mica-reinforced propylene resin composition of claim 1, wherein the organosilane compound is an aminosilane compound.

3. The mica-reinforced propylene resin composition of claim 1, wherein the bismaleimide compound is m-phenylenebismaleimide.

4. The mica-reinforced propylene resin composition according to claim 1, wherein the weight ratio of the organosilane compound to the mica falls within the range of from 0.1:100 to 1.0:100.

5. The mica-reinforced propylene resin composition according to claim 1, wherein the mica is flaky mica having an average diameter of 60 μ to 700 μ and an aspect ratio of 30 to 80.

6. The mica-reinforced propylene resin composition according to claim 1, wherein the organic peroxide is present in an amount which falls within the range of from 0.001 to 0.05 part by weight per 100 parts by weight of the mixture (A) and (B).

7. The mica-reinforced propylene resin composition according to claim 1, wherein the heating and melting treatment is carried out at a temperature of from 210° C. to 290° C.

8. The mica-reinforced propylene resin composition according to claim 1, wherein the organosilane compound is an amino silane compound and the bismaleimide compound is m-phenylenebismaleimide.

9. The mica-reinforced propylene resin composition according to claim 1, wherein the weight ratio of the organosilane compound to the mica falls within the range of from 0.1:100 to 1.0:100, said mica is flaky mica having an average diameter of 60 μ to 700 μ and an aspect ratio of 30 to 80, the amount of the organic peroxide falls within the range of from 0.001 to 0.5 part by weight per 100 parts by weight of the mixture of (A) and (B) and the heating and melting treatment is carried out at a temperature of from 210° C. to 290° C.

10. The mica-reinforced propylene resin composition according to claim 1, wherein the bismaleimide compound is represented by the formula (I)

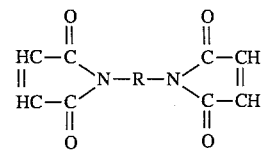

wherein R is a substituted or unsubstituted aromatic hydrocarbon group, or a substituted or unsubstituted aliphatic hydrocarbon group.

11. The mica-reinforced propylene resin composition according to claim 10, wherein said bismaleimide compound is selected from the group consisting of 4,4'-methylenediaphenyl-bismaleimide, m-phenylbismaleimide, 4-methyl-m-phenylbismaleimide, 4,4'-ethylenediphenylbismalelmide and 4,4'-vinylenediphenylbismaleimide.

12. A pellet obtained by pelletizing a mica-reinforced propylene resin composition obtained by heating and melting a mixture consisting essentially of (A) 40 to 95 parts by weight of a crystalline polypropylene, (B) 60 to 5 parts by weight of mica treated with an organosilane compound wherein the weight ratio of said organosilane compound to said mica falls within the range of from 0.01:100 to 2.0:100, (C) a bismaleimide compound in an amount of 0.01 to 2.0 parts by weight per 100 parts by weight of the sum of components (A) and (B), and (D) an organic peroxide wherein said organic peroxide is present in an amount of up to 0.05 parts by weight, and wherein said composition has a volatile matter content at 105° C. of 0.12% or less.

13. A mica-reinforced propylene resin composition obtained by heating and melting a mixture consisting essentially of CA) 40 to 95 parts by weight of a crystalline polypropylene, (B) 60 to 5 parts by weight of mica treated with an organosilane compound wherein the weight ratio of said organosilane compound to said mica falls within the range of from 0.01:100 to 2.0:100, (C) a bismaleimide compound in an amount of 0.01 to 2.0 parts by weight per 100 parts by weight of the sum of components (A) and (B), and (D) an organic peroxide wherein said organic peroxide is present in an amount of up to 0.05 parts by weight, and wherein said composition has a volatile matter content at 105° C. of 0.12% or less.

* * * * *